(12) United States Patent
Samuel

(10) Patent No.: US 7,809,918 B1
(45) Date of Patent: Oct. 5, 2010

(54) METHOD, APPARATUS, AND COMPUTER-READABLE MEDIUM FOR PROVIDING PHYSICAL MEMORY MANAGEMENT FUNCTIONS

(75) Inventor: Balasingh Samuel, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 213 days.

(21) Appl. No.: 11/187,425

(22) Filed: Jul. 22, 2005

(51) Int. Cl.
*G06F 12/00* (2006.01)
*G06F 13/00* (2006.01)
*G06F 13/28* (2006.01)

(52) U.S. Cl. .............. 711/171; 711/E12.002

(58) Field of Classification Search .......... 711/171
See application file for complete search history.

(56) References Cited

U.S. PATENT DOCUMENTS

| | | | |
|---|---|---|---|
| 5,561,786 A * | 10/1996 | Morse | 711/170 |
| 5,680,582 A * | 10/1997 | Slayden | 711/171 |
| 5,742,797 A * | 4/1998 | Celi et al. | 345/548 |
| 6,401,182 B1 * | 6/2002 | Sweeney | 711/170 |
| 6,430,665 B1 * | 8/2002 | Allison et al. | 711/172 |
| 6,442,661 B1 * | 8/2002 | Dreszer | 711/170 |
| 6,446,183 B1 * | 9/2002 | Challenger et al. | 711/170 |
| 6,643,754 B1 * | 11/2003 | Challenger et al. | 711/171 |
| 6,701,420 B1 * | 3/2004 | Hamilton et al. | 711/170 |
| 6,754,788 B2 * | 6/2004 | Mathews et al. | 711/153 |
| 6,874,074 B1 * | 3/2005 | Burton et al. | 711/170 |
| 7,035,989 B1 * | 4/2006 | Hinker et al. | 711/171 |
| 7,107,426 B2 * | 9/2006 | Kolodner et al. | 711/170 |
| 7,188,238 B2 * | 3/2007 | Bulusu et al. | 713/2 |
| 7,325,118 B2 * | 1/2008 | Lee | 711/170 |
| 2002/0133678 A1 * | 9/2002 | Mathews et al. | 711/153 |
| 2003/0023825 A1 * | 1/2003 | Woo et al. | 711/170 |
| 2003/0084263 A1 * | 5/2003 | Knippel et al. | 711/170 |
| 2003/0084265 A1 * | 5/2003 | Heller et al. | 711/170 |
| 2003/0084266 A1 * | 5/2003 | Knippel et al. | 711/173 |
| 2004/0064664 A1 * | 4/2004 | Gil | 711/170 |
| 2004/0193829 A1 * | 9/2004 | Woo et al. | 711/170 |
| 2005/0283602 A1 * | 12/2005 | Vembu et al. | 713/150 |
| 2006/0004975 A1 * | 1/2006 | Matheny | 711/165 |
| 2006/0004982 A1 * | 1/2006 | Matheny | 711/202 |
| 2006/0190697 A1 * | 8/2006 | Grant | 711/170 |
| 2007/0011428 A1 * | 1/2007 | Kurtz | 711/171 |

* cited by examiner

*Primary Examiner*—Sheng-Jen Tsai
*Assistant Examiner*—Matthew R Chrzanowski
(74) *Attorney, Agent, or Firm*—Hope Baldauff Hartman, LLC

(57) ABSTRACT

A method, apparatus, and computer-readable medium for providing memory management functions are provided. According to one method, a memory allocation process is exposed that receives a requested memory size with a memory allocation request and returns a pointer to an area of allocated memory of the requested memory size if available. A memory deallocation process is also exposed that receives requests to deallocate previously allocated memory regions in the form of a pointer to the memory region to be deallocated. The allocation and deallocation processes maintain a list of linked lists, each of the linked lists describing an unallocated portion of the memory. Only a single linked list must be updated by the allocation process. The deallocation process adds a new linked list and rebuilds the list of linked lists to merge any linked lists corresponding to adjacent portions of memory.

11 Claims, 11 Drawing Sheets

METHOD, APPARATUS, AND COMPUTER-READABLE MEDIUM FOR PROVIDING PHYSICAL MEMORY MANAGEMENT FUNCTIONS

TECHNICAL FIELD

The present invention is related to memory management. More particularly, the present invention is related to providing physical memory management functions within a limited capability computing environment.

BACKGROUND OF THE INVENTION

Most non-trivial computing environments include some form of physical memory management. Memory management refers generally to the act of managing the memory available in the computer system. More specifically, memory management typically involves providing routines for allocating portions of the available memory to programs at their request. Memory management also involves providing ways of deallocating, also called "freeing", the memory at the request of a program and thereby returning it to the computer system for reuse.

In most non-trivial computing environments, memory management functions are handled by the operating system. Typically, an application program makes a request to the operating system to allocate memory to the application program. When the application program no longer needs the allocated memory, the application program then calls the operating system with an instruction to free the previously allocated memory region.

While memory management functions are typically provided by the operating system in non-trivial computing environments, memory management functionality is typically unavailable in computing environments having limited processing capability or where an operating system is not available. For instance, an embedded computing system having limited computing capabilities would typically not offer memory management functions. Similarly, a pre-boot computing environment, such as a basic input output system ("BIOS"), that performs its functions prior to the execution of an operating system would also not offer memory management functions to routines executing within the BIOS environment.

One reason that memory management functions are not made available in limited capability computing environments and in pre-boot computing environments is that these environments typically have limited system resources available. For instance, these environments typically have small amounts of available memory. Previous routines for providing memory management functions require large amounts of memory and are therefore not well suited for execution in these environments. Moreover, many previous routines for providing memory management functions perform significant processing within the memory allocation routines. This can create a significant performance penalty for applications that perform many memory allocations in a limited capability computing environment.

It is with respect to these considerations and others that the present invention has been made.

SUMMARY OF THE INVENTION

In accordance with the present invention, the above and other problems are solved by providing a method, computer-readable medium, and apparatus for providing memory management functions. According to one aspect of the invention, memory management functionality is provided in a manner that is suitable for use in a limited computing capability environment or a pre-boot environment. Moreover, the memory management functionality provided by the embodiments of the invention described herein performs the bulk of its processing at the time that memory is deallocated, thereby reducing the processing requirements at the time that memory is allocated.

According to one method provided by an embodiment of the invention, a memory allocation process is exposed for use by calling programs. The memory allocation process receives requests to allocate a portion of a physical computer memory. In particular, the memory allocation process receives a requested memory size with a memory allocation request and returns a pointer to an area of allocated memory of the requested memory size if available. If memory is not available in the requested memory size, the memory allocation process returns an indication that the memory could not be allocated.

When the memory allocation process receives a request to allocate a portion of the physical computer memory, the allocation process determines whether the requested memory size is available for allocation. In order to provide this functionality, the allocation process maintains a list of linked lists, each of the linked lists corresponding to an unallocated portion of the computer memory. In particular, each linked list includes a pointer to the start of an unallocated portion of the memory, data identifying the size of the unallocated portion of the memory, and a pointer to a next linked list in the list of linked lists. By scanning the list of linked lists to identify an unallocated portion of the memory equal or larger than the requested memory size, the allocation process can determine whether an unallocated portion of the memory is available to satisfy the allocation request.

If the requested memory size is available for allocation, the requested memory size is allocated by updating the linked list that corresponds to the portion of available memory that satisfies the requested memory size. In order to allocate the requested memory, the pointer in the linked list is updated to reflect a new start of unallocated memory following the allocation and the data is updated to reflect the new size of the unallocated memory following the allocation. In particular, the size of the unallocated memory is reduced by the size of the allocated portion. Once the memory has been allocated, a pointer to the allocated memory is returned in response to the allocation request.

According to embodiments of the invention, data may be written adjacent to the allocated portion of the memory identifying the size of the allocated memory area. This data may be utilized by a deallocation process to determine the size of the allocated memory. A unique digital signature may also be written adjacent to the allocated portion of the memory. The unique digital signature may be used by the deallocation process to determine whether a portion of the memory to be deallocated actually corresponds to a portion of the memory allocated by the allocation process.

According to other aspects of the method, a memory deallocation process is also exposed for use by calling programs. The memory deallocation process receives requests to deallocate previously allocated memory regions. The deallocation process takes as a parameter a pointer to the memory region to be deallocated. In response to receiving a deallocation request, the deallocation process determines the size of the portion of memory to be deallocated. This may include, for instance, reading from the appropriate memory location the size of the memory region. The memory deallocation process may also determine whether the portion of the memory to be deallocated corresponds to a portion of memory allocated by the allocation process. This may be performed, for instance, by reading and verifying a unique digital signature saved during the allocation process. If the requested portion of the memory to be deallocated does not correspond to memory allocated by the allocation process, then no memory is deallocated.

If the memory to be deallocated corresponds to a region allocated by the allocation process, the deallocation process creates a new linked list in the list of linked lists corresponding to the portion of memory to be deallocated. The deallocation process then rebuilds the list of linked lists. To rebuild the list of linked lists, the deallocation process merges linked lists in the list of linked lists that correspond to adjacent portions of the computer memory. In this manner, the bulk of the overhead incurred during the memory management operations is performed by the deallocation process.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
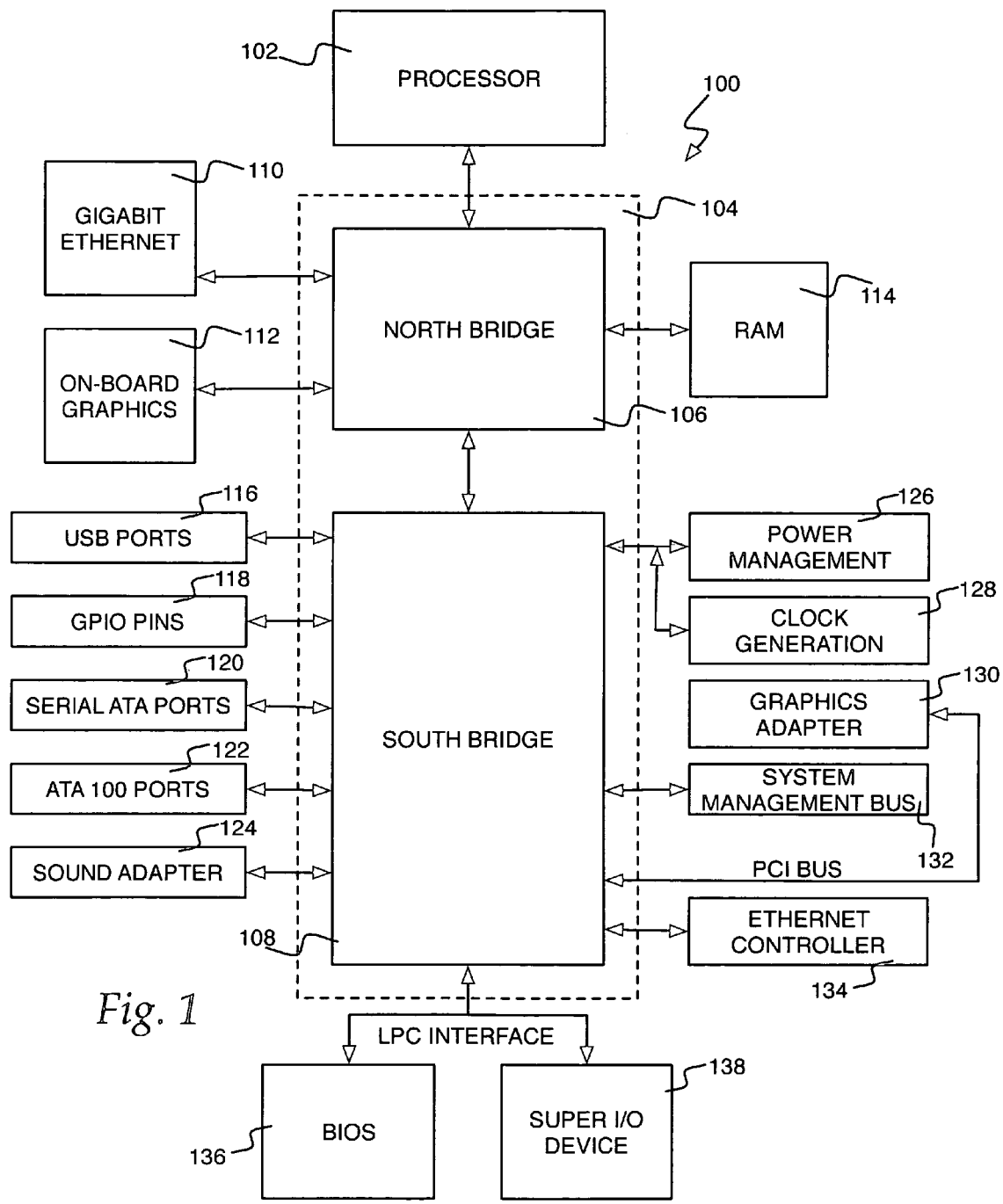
FIG. 1 is a computer architecture diagram showing aspects of a computer utilized as an illustrative operating environment for the various embodiments of the invention.

Embodiments of the present invention provide methods, systems, apparatus, and computer-readable media for providing memory management functions. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the invention will be provided. In particular, FIG. 1 illustrates an computer architecture for practicing the embodiments of the present invention. It should be appreciated, however, that although the embodiments of the invention described herein are discussed in the context of a conventional desktop or server computer, the embodiments of the invention may be utilized with virtually any type of computing device. For instance, embodiments of the invention may be utilized with limited capability computing devices that have limited amounts of random access memory, limited computing capacity, limited or no operating system software, or other significant software or hardware limitations that prevent the execution of traditional memory management software.

As described briefly above, the embodiments of the invention provide memory management functionality. An illustrative computer architecture for practicing the various embodiments of the invention will now be described. In particular, a computer 100 is utilized that is operative to execute software for providing memory management functionality to calling programs, routines, or processes. In order to provide this functionality, the computer 100 includes a baseboard, or "motherboard", which is a printed circuit board to which a multitude of components or devices may be connected by way of a system bus or other electrical communication path. In one illustrative embodiment, a central processing unit ("CPU") 102 operates in conjunction with a chipset 104. The CPU 102 is a standard central processor that performs arithmetic and logical operations necessary for the operation of the computer.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a bus for interfacing peripheral card devices such as a graphics adapter 130. In one embodiment, the bus comprises a peripheral component interconnect ("PCI") bus. The south bridge 108 may also provide a system management bus 132 for use in managing the various components of the computer 100. Power management circuitry 126 and clock generation circuitry 128 may also be utilized during the operation of the south bridge 108.

The south bridge 108 is also operative to provide one or more interfaces for connecting mass storage devices to the computer 100. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. As described in detail herein, the embodiments of the invention do not require an operating system to be executing in order to provide the memory management functionality described herein.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 that includes program code containing the basic routines that help to start up the computer 100 and to transfer information between elements within the computer 100. According to embodiments of the invention, the BIOS 136 provides the memory management functionality described herein to calling applications, programs, routines, or processes in a pre-boot environment. This pre-boot environment exists while the BIOS 136 is initializing the computer 100 and prior to passing control of the computer 100 to an operating system. In this regard, the BIOS 136 is operative to expose routines for allocation a portion of the RAM 114 and for deallocating a portion of the RAM 114. Additional details regarding these routines are provided with respect to FIGS. 2-11.

It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

Figure 2:
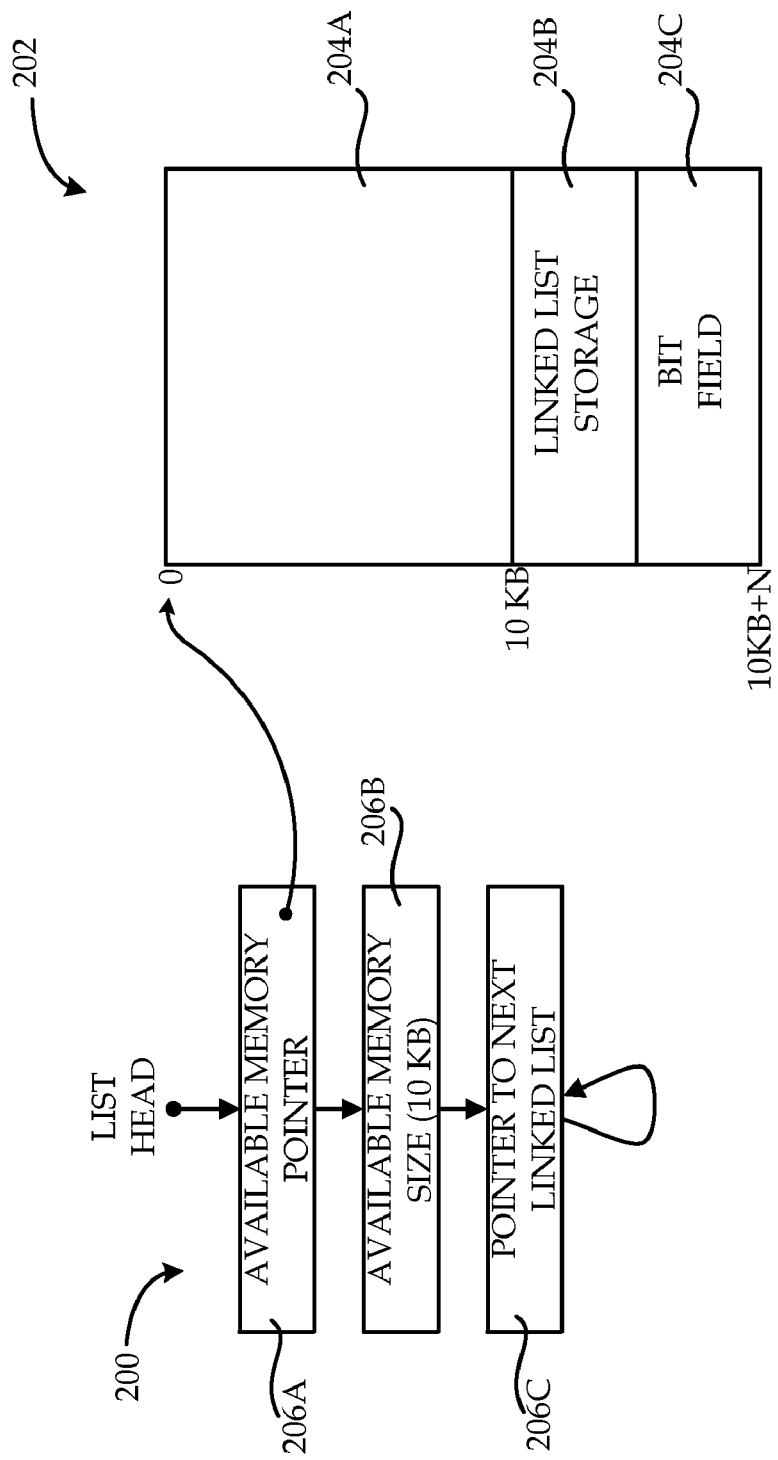
FIGS. 2-8 are linked list and memory diagrams illustrating aspects of an illustrative linked list utilized in the embodiments of the invention.

Turning now to FIG. 2, an illustrative data structure utilized in the embodiments of the invention will be described. In particular, FIG. 2 shows a list of linked lists 200. The list of linked lists 200 is utilized by the various embodiments of the invention to store data regarding physical memory that is available for allocation. To illustrate this, a portion 202 of the RAM 114 of the computer 100 is also illustrated in FIG. 2. The portion 202 includes a portion 204A that is available for allocation, a portion 204B that is utilized to store the list of linked lists 200, and a portion 204C that is utilized to store a bit field 204C. The bit field 204C is utilized to create a map into the portion 204B. In the example shown in FIG. 2, ten kilobytes of memory has been made available for allocation. Accordingly, the size of the portion 204A is ten kilobytes.

Each linked list in the list of linked lists 200 includes several nodes. In particular, a node 206A is utilized for storing a pointer to the beginning of an area of memory that is available for allocation. In the example shown in FIG. 2, the pointer referenced by the node 206A points to the beginning of the portion 204A. A node 206B is also utilized that stores data describing the size of the memory portion referenced by the pointer stored in the node 206A. In the example shown in FIG. 2, the node 206B includes data indicating that the size of the portion 204A is ten kilobytes. A node 206C is also provided that contains a pointer to the next linked list in the list of linked lists 200. In the example shown in FIG. 2, only one area of memory is available for allocation and therefore only one linked list is present in the list of linked lists 200. Accordingly, the pointer stored by the node 206C is null.

Figure 3:
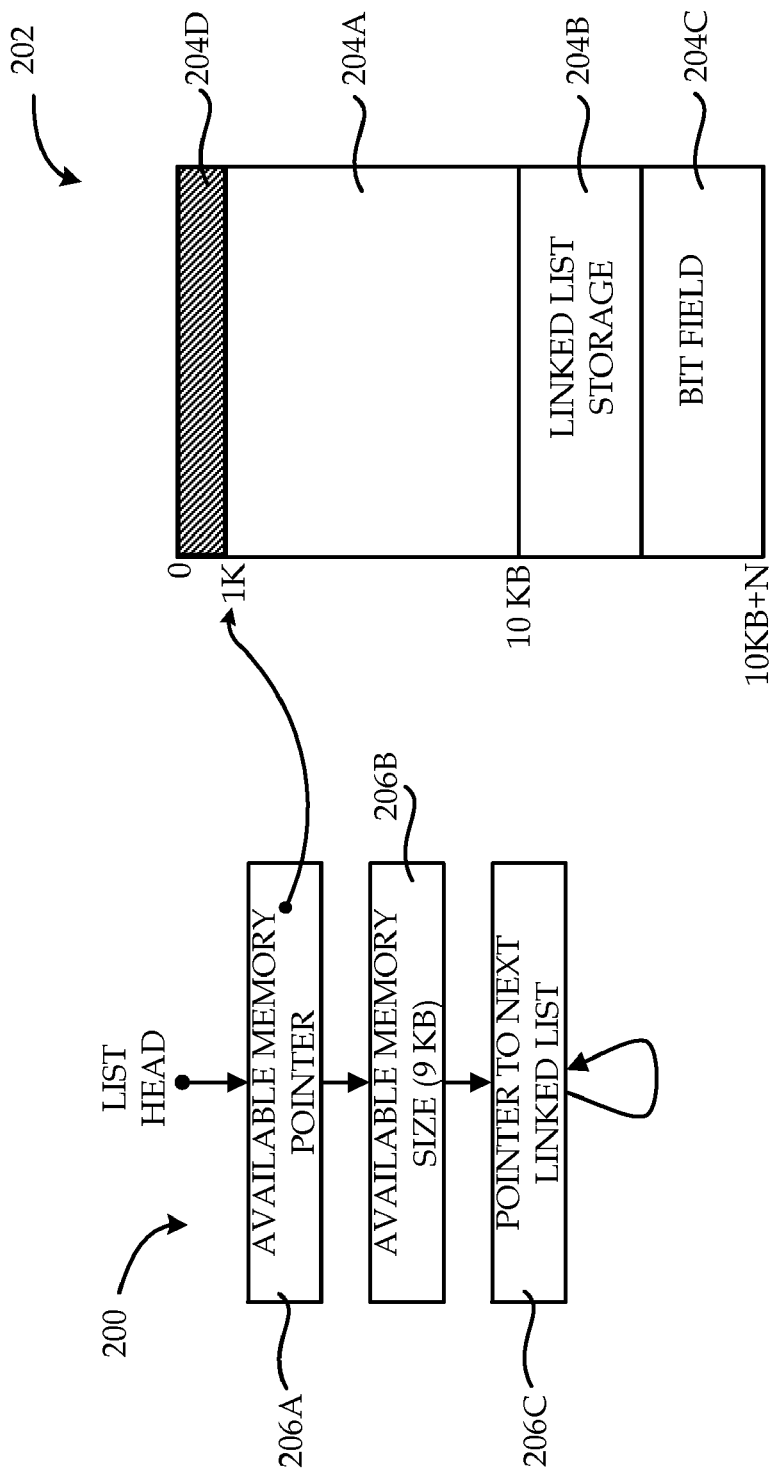

Referring now to FIG. 3, additional details regarding the list of linked lists 200 will be provided. In particular, FIG. 3 illustrates the contents of the list 200 following a memory allocation operation. In the example shown in FIG. 3, a one kilobyte portion 204D of the memory has been allocated. As a result, the pointer referenced by the node 206A has been modified to point to the beginning of the portion 204A. The portion 204A represents the unallocated portion of the memory following the allocation of the one kilobyte portion 204D. Additionally, the data stored within the node 206B has also been updated to indicate that the size of the portion 204A has been reduced by the size of the allocated portion, one kilobyte. Accordingly, the list of linked lists 200 shown in FIG. 3 indicates the size and location of the memory available for allocation following the allocation of the one kilobyte portion 204D. It should be appreciated that the portion 204D was allocated by only modifying the pointer stored in the node 206A and the size data stored in the node 206B. No rebuilding or sorting of the list of linked lists 200 is necessary during an allocation operation.

Figure 4:
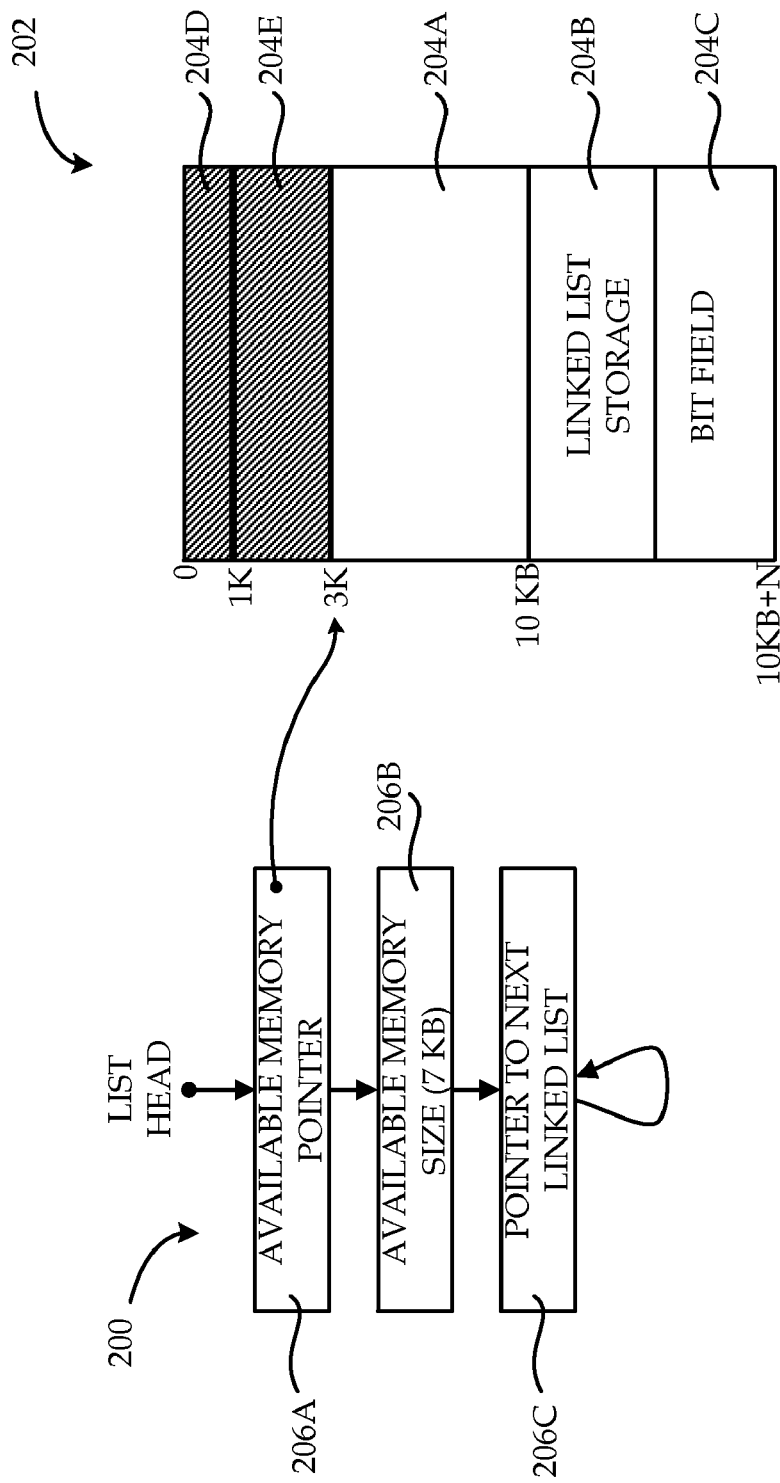

Turning now to FIG. 4, additional details regarding the list of linked lists 200 will be provided. In particular, FIG. 4 illustrates the contents of the list 200 following a second memory allocation operation. In the example shown in FIG. 4, a two kilobyte portion 204E of the memory has been allocated. As a result, the pointer referenced by the node 206A has been modified to point to the beginning of the portion 204A. The portion 204A represents the unallocated portion of the memory following the allocation of the one kilobyte portion 204D and the two kilobyte portion 204E. Additionally, the data stored within the node 206B has also been updated to indicate that the size of the portion 204A has been reduced by the size of the allocated portion, two kilobytes. Accordingly, the list of linked lists 200 shown in FIG. 4 indicates the size and location of the memory available for allocation following the allocation of the one kilobyte portion 204D and the two kilobyte portion 204E. It should be appreciated that the portion 204E was allocated by only modifying the pointer stored in the node 206A and the size data stored in the node 206B.

Figure 5:
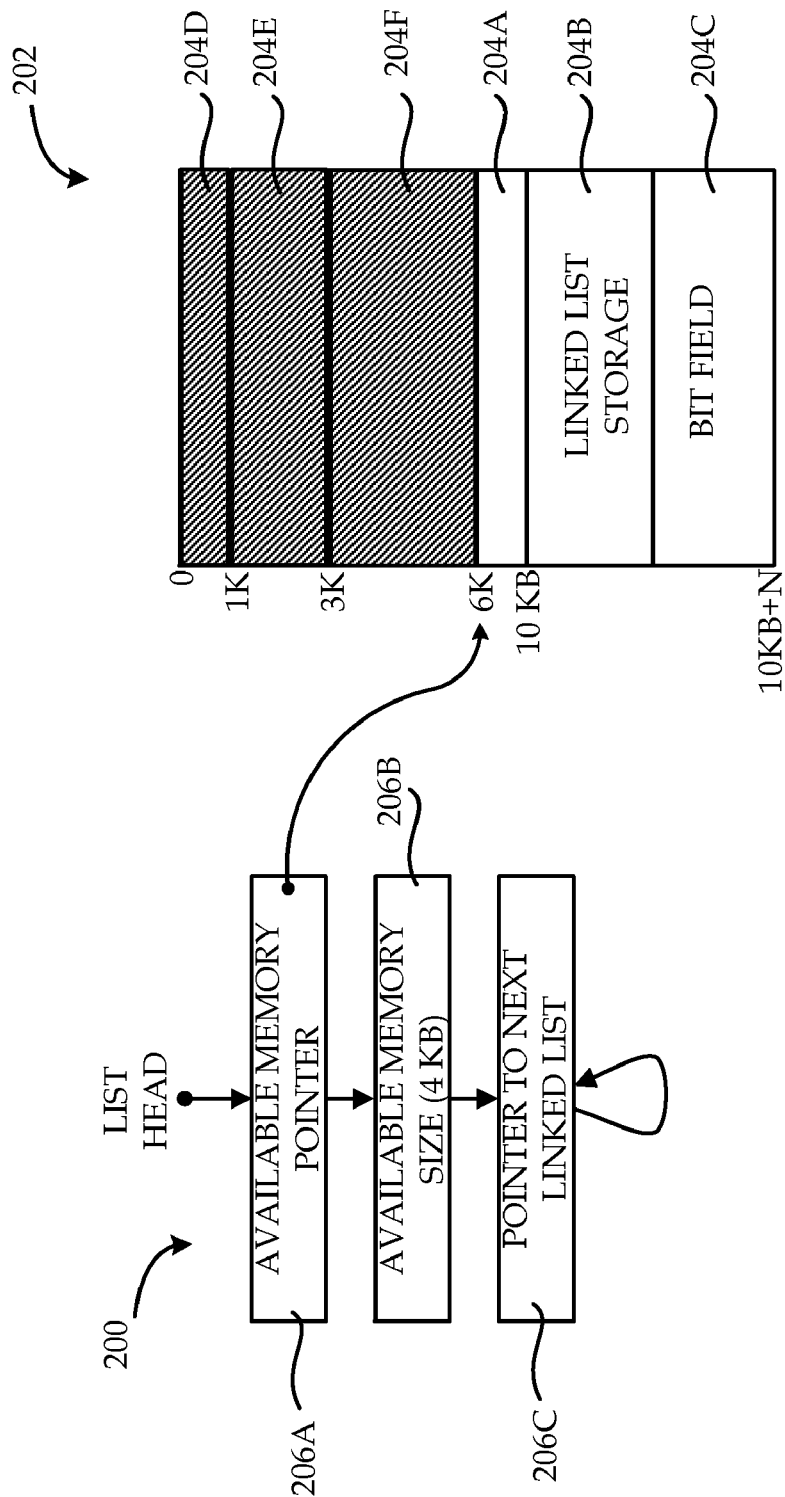

Referring now to FIG. 5, the results of a third memory allocation operation on the illustrative list of linked lists 200 will be described. In particular, FIG. 5 illustrates the contents of the list 200 following a third memory allocation operation. In the example shown in FIG. 5, a three kilobyte portion 204F of the memory has been allocated. As a result, the pointer referenced by the node 206A has been modified to point to the new beginning of the portion 204A. The portion 204A represents the unallocated portion of the memory following the allocation of the one kilobyte portion 204D, the two kilobyte portion 204E, and the three kilobyte portion 204F. Additionally, the data stored within the node 206B has also been updated to indicate that the size of the portion 204A has been reduced by the size of the allocated portion, three kilobytes. Accordingly, the list of linked lists 200 shown in FIG. 5 indicates the size and location of the memory available for allocation following the allocation of the one kilobyte portion 204D, the two kilobyte portion 204E, and the three kilobyte portion 204F. It should be appreciated that the portions 204D, 204E, and 204F have all been allocated by only modifying the pointer stored in the node 206A and the size data stored in the node 206B.

Figure 6:
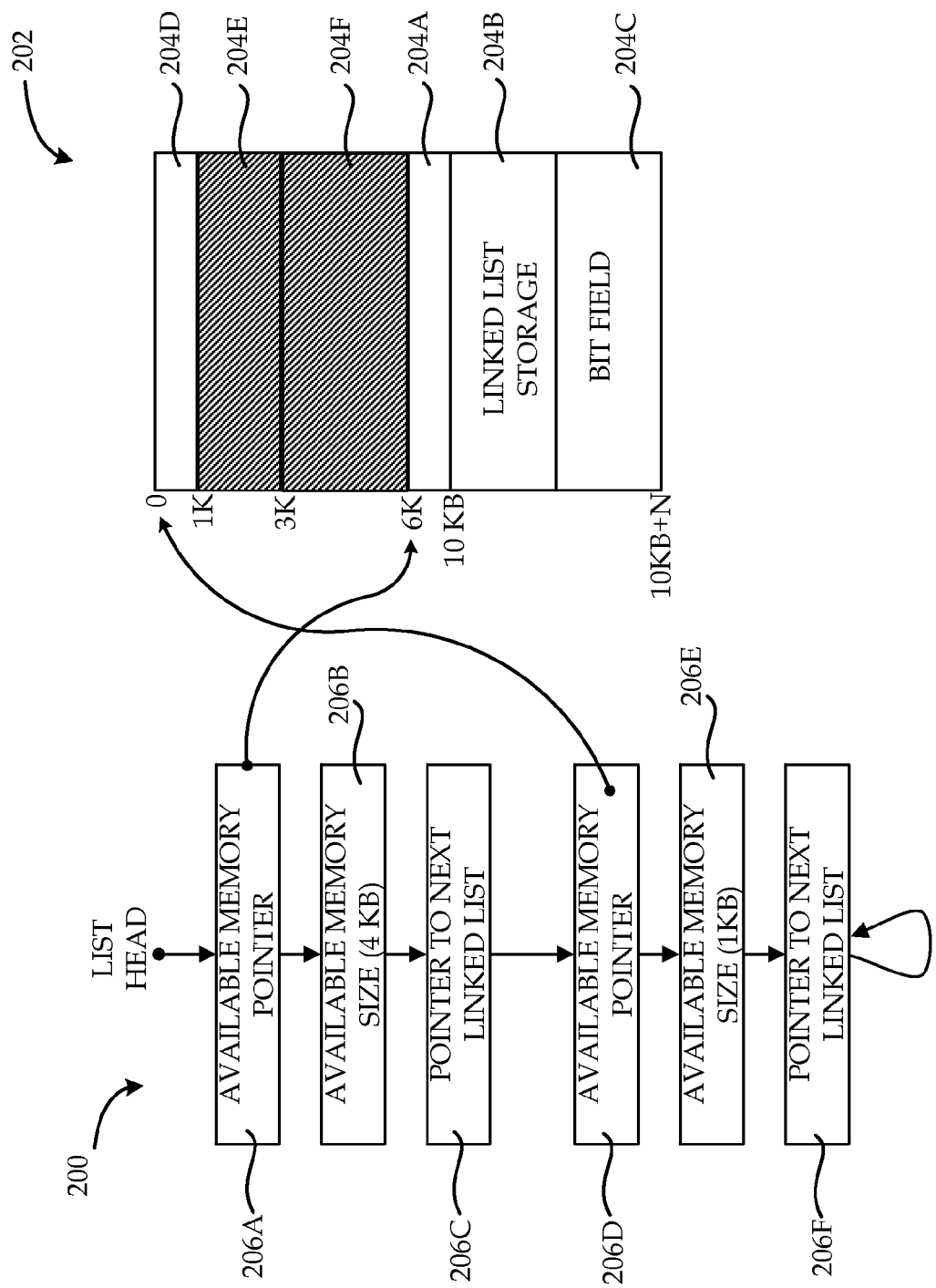

Turning now to FIG. 6, the results of a memory deallocation operation on the illustrative list of linked lists 200 will be described. In particular, FIG. 6 illustrates the contents of the list 200 following a deallocation operation deallocating the portion 204D. In the example shown in FIG. 6, the portion 204D has been deallocated. As a result, a new list has been added to the list of linked lists 200 to describe the newly unallocated portion 204D of the physical memory. In particular, a node 206D is added that points to the start of the portion 204D and a node 206E has been added that describes the size of the deallocated portion (one kilobyte). A node 206F has also been added that points to the next list in the list of linked lists. However, because no additional linked lists are present, the value of the pointer stored in the node 206F is null. It should be appreciated that the nodes 206A and 206B continue to describe the location and size of the portion 204A, respectively. It should also be appreciated that the pointer stored in the node 206C has been modified to point to the newly added list. In this manner, memory can be deallocated by simply adding a new linked list to the list of linked lists 200.

Figure 7:
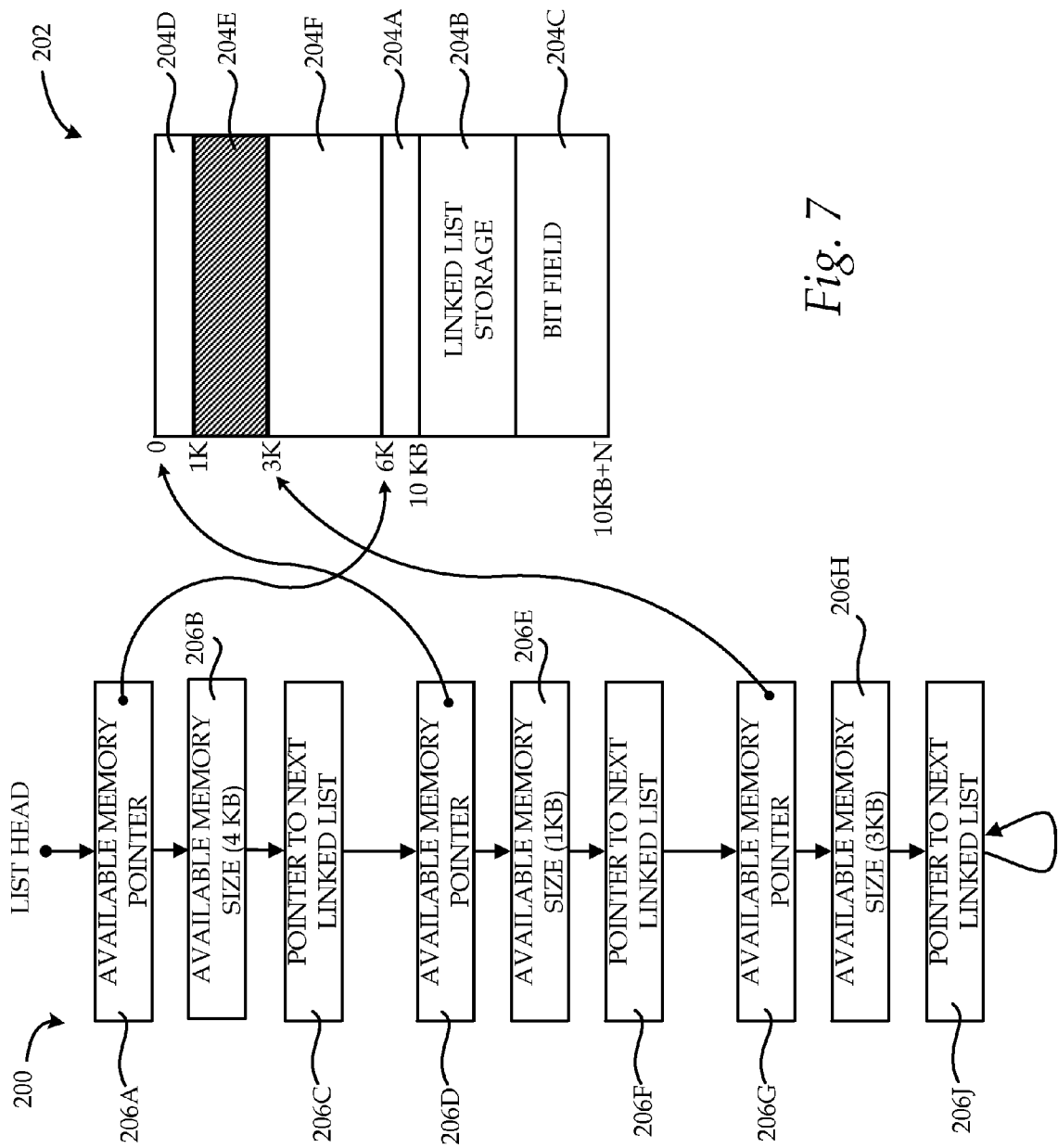

Referring now to FIG. 7, the results of a second memory deallocation operation on the illustrative list of linked lists 200 will be described. In particular, FIG. 7 illustrates the contents of the list 200 following a second deallocation operation deallocating the portion 204F. In the example shown in FIG. 7, the portion 204F has been deallocated. As a result, a new list has been added to the list of linked lists 200 to describe the newly unallocated portion 204F of the physical memory. In particular, a node 206G is added that points to the start of the portion 204F and a node 206H has been added that describes the size of the deallocated portion (three kilobytes). A node 206J has also been added to point to the next list in the list of linked lists. However, because no additional linked lists are present, the value of the pointer stored in the node 206J is null. It should also be appreciated that the pointer stored in the node 206F has been modified to point to the newly added list.

Figure 8:
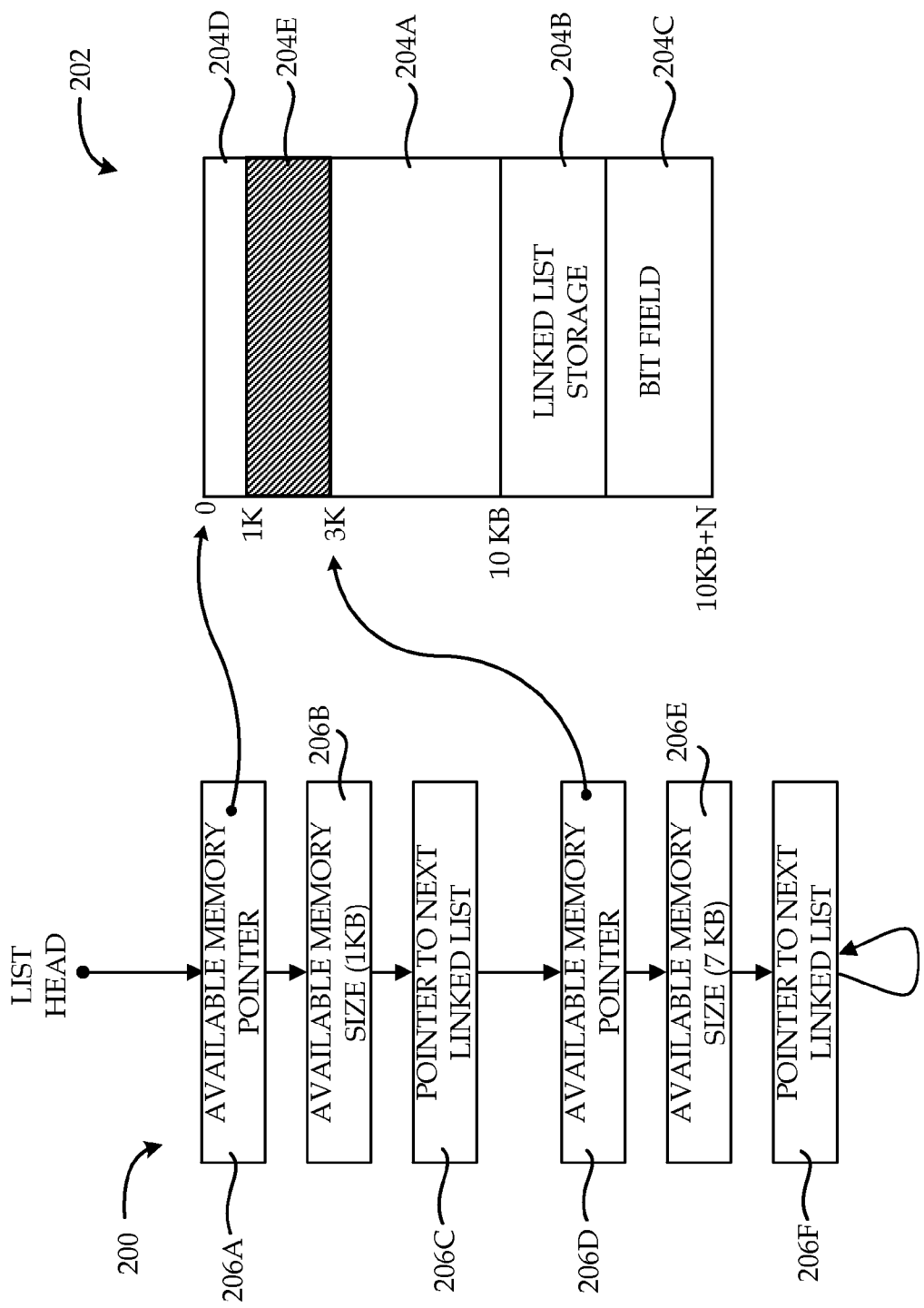

According to embodiments of the invention, a rebuild process is performed following each memory deallocation. The rebuild process merges any lists in the list of linked lists that refer to adjacent portions of memory. In the example shown in FIG. 7, the portions 204F and 204A are adjacent to one another. Accordingly, lists in the list of linked lists can be merged to save memory. The results of this process are illustrated in FIG. 8. As shown in FIG. 8, the list of linked lists 200 includes only two linked lists following the rebuild process. In particular, the second list includes a node 206D that points to the start of the portion 204A and a node 206E that describes the size of the merged portion 204A (7 KB). In this manner, the list rebuilding process merges lists in the list of linked lists 200 when they refer to adjacent memory portions.

Figure 9:
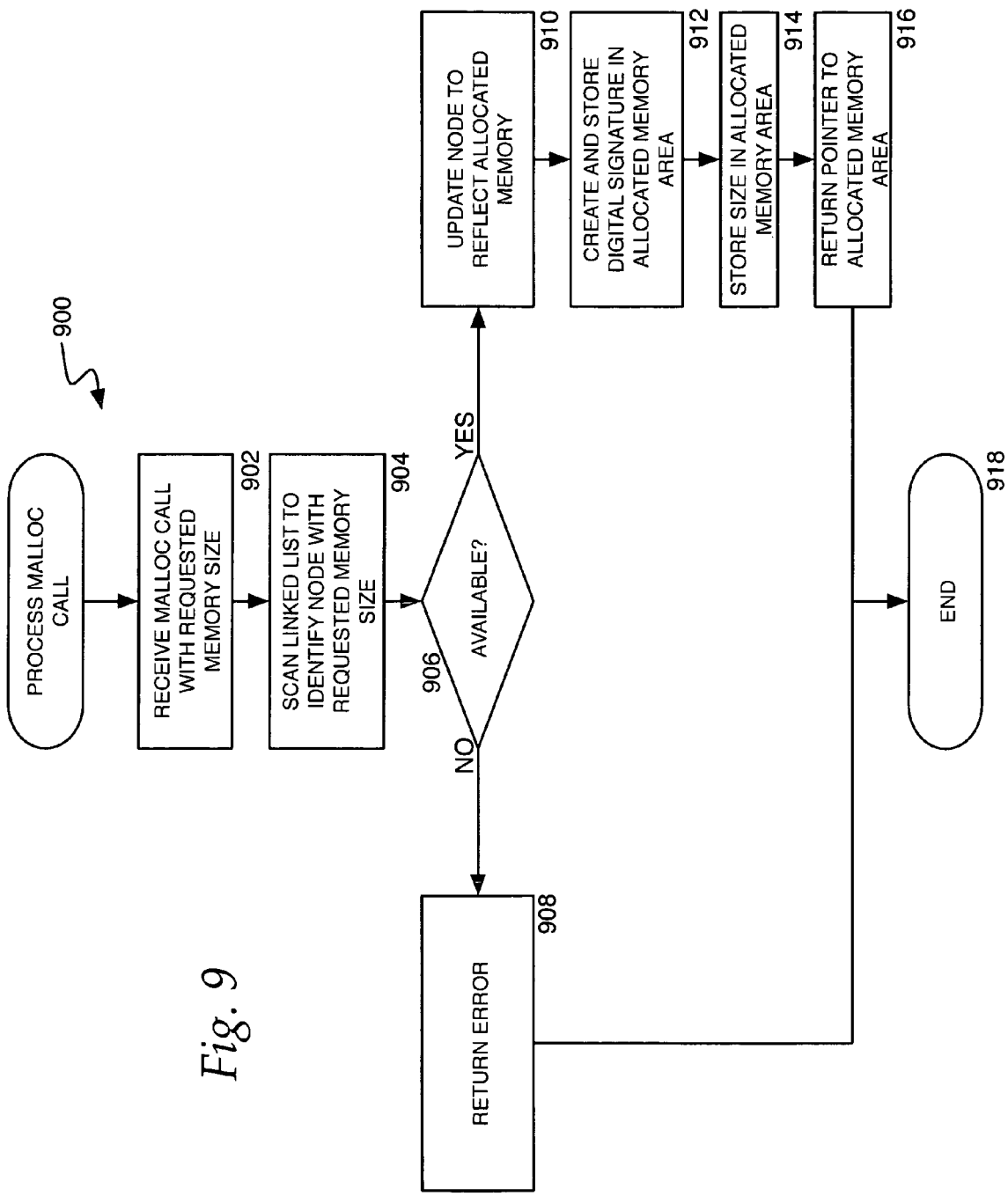
FIGS. 9-10 are flow diagrams illustrating aspects of an allocation process and a deallocation process, respectively.

Referring now to FIG. 9, additional details regarding the operation of the computer 100 for providing memory management functionality will be described. In particular, an illustrative routine 900 will be described illustrating the operation of program code executing within the BIOS 136 for exposing and implementing a function for allocating a portion of the physical memory of the computer 100 according to one embodiment of the invention. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 9 and 10 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 900 begins at operation 902, where memory management code executing within the BIOS 136 receives a request to allocate a portion of the computer's physical memory (also referred to as a "malloc" request). The allocation request identifies the size of the portion of the computer memory to be allocated. From operation 902, the routine 900 continues to operation 904 where the list of linked lists 200 is scanned, or searched, to identify a linked list referring to a portion of the memory large enough to satisfy the request. If a portion of the memory is not available that is large enough to satisfy the request, the routine 900 branches from operation 906 to operation 908, where an error is returned to the calling application or process. If a list in the list of linked lists 200 is identified that refers to a portion of the memory large enough to satisfy the allocation request, the routine 900 branches from operation 906 to operation 910.

At operation 910, the nodes of the linked list identified during the scanning operation are updated to reflect the new allocation of memory. In particular, the pointer stored by the linked list may be updated to refer to the new start of an unallocated portion of memory following the allocation. The data describing the size of the unallocated portion may also be reduced by the allocated amount of memory. The routine 900 then continues to operation 912.

Figure 11:
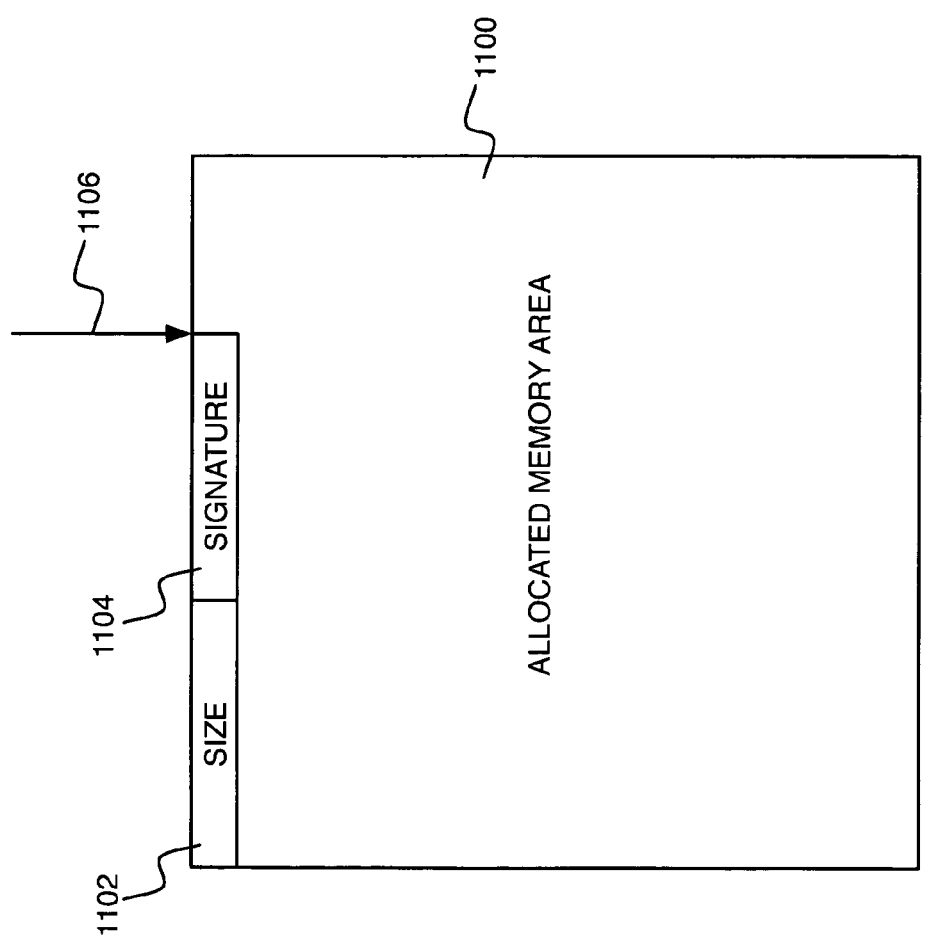
FIG. 11 is a memory diagram illustrating aspects of an allocated region of memory in the various embodiments of the invention.

At operation 912, a unique digital signature is created and stored in an area adjacent to the allocated portion of the memory. The digital signature may comprise a unique string of characters or a more complex signature. As will be described in greater detail below, the digital signature is utilized during the deallocation process to ensure that memory areas were properly allocated by the allocation routine prior to deallocation. From operation 912, the routine 900 continues to operation 914, where the size of the newly allocated portion of memory is also stored in the memory in an area adjacent to the allocated portion. FIG. 11 illustrates the location of the size data 1102 and the digital signature 1104 with respect to an allocated memory area 1100. It should be appreciated that the pointer 1106 is the pointer returned in response to a call to the memory allocation process. In this manner, the digital signature and the size data are stored in an area adjacent to the allocated portion of memory. At operation 916, the pointer to the allocated memory is returned in response to the allocation request. From operations 916 and 908, the routine 900 continues to operation 918, where it ends.

Figure 10:
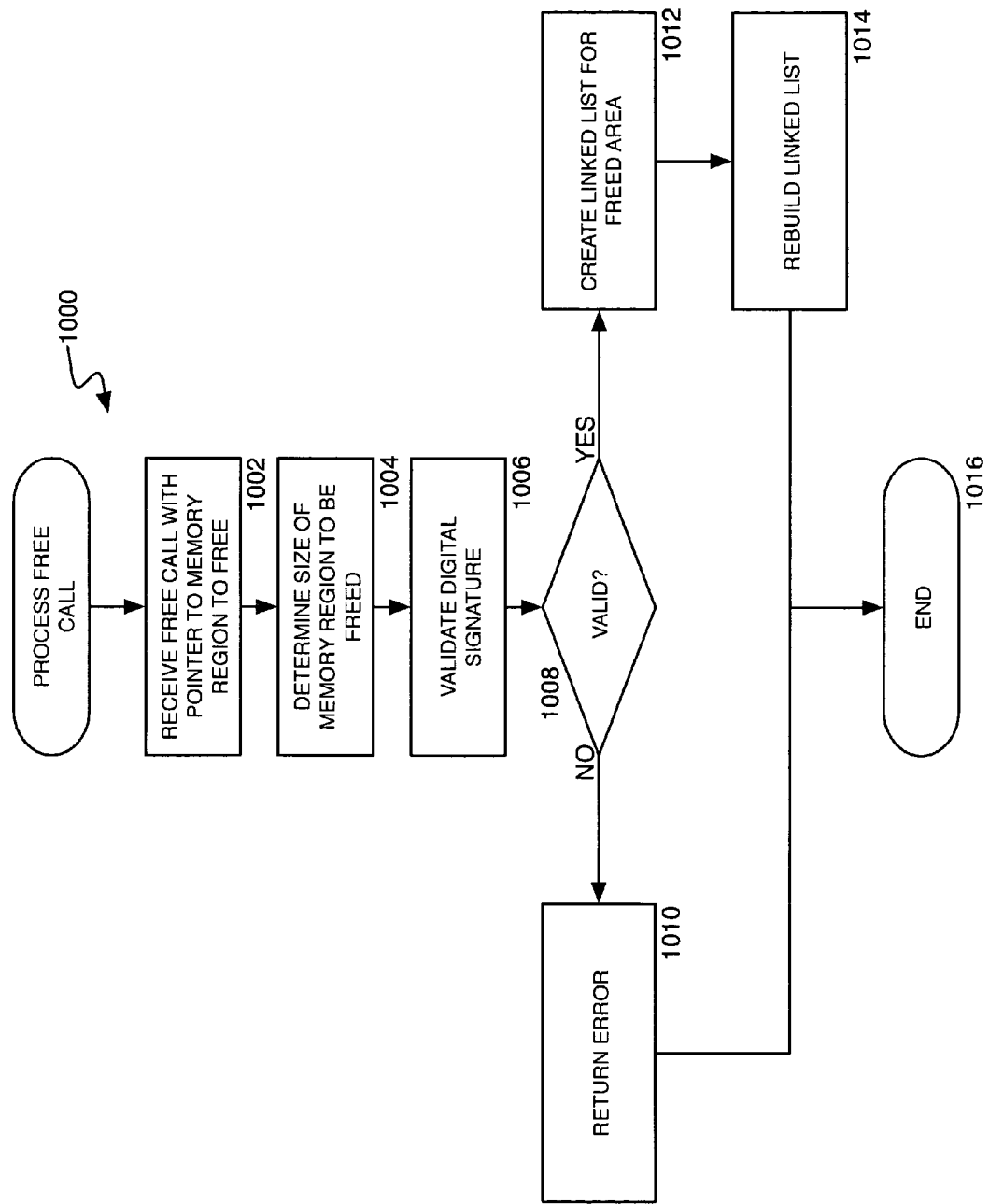

Referring now to FIG. 10, an illustrative routine 1000 will be described illustrating the operation of program code executing within the BIOS 136 for exposing and implementing a function for deallocating a portion of the physical memory of the computer 100 according to one embodiment of the invention. The routine 1000 begins at operation 1002, where a request is received to deallocate a portion of the physical memory. The request includes a pointer to the region of the memory to be deallocated. In order to be considered valid, the pointer must refer specifically to the start of a portion of the memory previously allocated by the allocation routine. From operation 1002, the routine 1000 continues to operation 1004.

At operation 1004, the size of the memory region to be freed is determined. According to an embodiment, this is accomplished by retrieving the size data stored adjacent to the allocated memory region during the allocation process. The routine 1000 then continues to operation 1006, where the digital signature is also read from the appropriate location. An attempt is then made to validate the digital signature. If the read data is not a valid digital signature, the routine 1000 branches from operation 1008 to operation 1010, where an error is returned in response to the deallocation request. If the read data is a valid digital signature, the routine 1000 branches from operation 1008 to operation 1012, where a new linked list is added to the list of linked lists 200 corresponding to the newly deallocated memory area.

From operation 1012, the routine 1000 continues to operation 1014, where the list of linked lists 200 is rebuilt. As described above, the linked list rebuilding process comprises merging linked lists that refer to adjacent regions of the memory. From operations 1014 and 1010, the routine 1000 continues to operation 1016, where it ends.

It will be appreciated that embodiments of the present invention provide methods, systems, apparatus, and computer-readable medium for providing memory management functionality in a limited capability computing environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for providing physical memory management functions to programs executing in a pre-boot environment, the method comprising:

receiving an allocation request from a program executing in the pre-boot environment for allocating a portion of a physical computer memory, wherein the allocation request identifies a requested memory size, wherein the memory management functions are configured to maintain a single list of data structures describing the physical computer memory, the list of data structures comprising a first data structure describing a first area of the physical computer memory that is available for allocation, the first area comprising a first memory portion and a second memory portion contiguous to the first memory portion, the first data structure comprising a first pointer node, a first size node, and a first next node, the first pointer node referencing a beginning of the first memory portion of the physical computer memory, the first size node describing a combined memory size of the first memory portion and the second memory portion, the first next node referencing a null value, and wherein each and every data structure in the list of data structures describes an unallocated portion of the physical computer memory;

in response to receiving the allocation request, determining whether the requested memory size is available for allocation;

in response to determining that the requested memory size is available for allocation through the first memory portion, (i) allocating the first memory portion, (ii) updating the first pointer node from referencing the beginning of the first memory portion to referencing a beginning of the second memory portion, (iii) updating the first size node from describing the combined memory size of the first memory portion and the second memory portion to describing a memory size of the second memory portion, and (iv) returning a pointer to the first memory portion in response to the allocation request;

receiving a request to deallocate a second area of the physical computer memory that has been allocated, the request comprising a pointer to the second area of the physical computer memory to be deallocated; and in response to receiving the deallocation request, determining the size of the second area, determining whether the second area was allocated by the memory management functions, and in response to determining that the second area was allocated by the memory management functions, (i) deallocating the second area, (ii) creating a second data structure describing the second area, and (iii) updating the first next node from referencing the null value to referencing the second data structure, the second data structure comprising a second pointer node, a second size node, and a second next node, the second pointer node referencing a beginning of the second area, the second size node describing a memory size of the second area, and the second next node referencing the null value.

2. The method of claim 1, wherein each data structure in the list of data structures comprises a first pointer stored in a corresponding pointer node, the first pointer configured to point to the start of an unallocated portion of the physical computer memory, data stored in a corresponding size node identifying the size of the unallocated portion of the physical computer memory, and a second pointer stored in a corresponding next node that points to a next data structure in the list of data structures.

3. The method of claim 2, wherein determining whether the requested memory size is available for allocation comprises scanning the list of data structures to identify a data structure corresponding to an unallocated portion of the physical computer memory equal to or larger than the requested memory size; and in response to determining that the requested memory size is not available, returning an error.

4. The method of claim 3, wherein updating the data structure describing the unallocated portion of the physical computer memory to describe the unallocated portion of memory after the allocation of the requested memory comprises updating the first pointer stored in the identified data structure to reflect a new start of the unallocated portion of the physical computer memory and updating the data identifying the size of the unallocated portion in the identified data structure by reducing the size of the unallocated portion by the requested memory size.

5. The method of claim 1, further comprising in response to determining that the requested memory size is available for allocation:

writing data identifying the size of the allocated memory to a location adjacent to the allocated memory; and writing a unique digital signature comprising a verifiable unique string of characters to a location adjacent to the allocated memory.

6. The method of claim 5, wherein determining the size of the portion of the memory to be deallocated comprises reading the data identifying the size of the allocated memory from the portion of the memory identified by the pointer received with the deallocation request.

7. The method of claim 5, wherein determining whether the portion of the memory to be deallocated corresponds to a portion of the memory allocated by the memory management functions comprises reading and verifying the unique digital signature from the portion of the memory identified by the pointer received with the deallocation request.

8. A computer storage medium having computer-readable instructions stored thereon which, when executed by a computer in a pre-boot environment, cause the computer to:

receive an allocation request from a program executing in the pre-boot environment for allocating a portion of a physical computer memory, wherein the allocation request identifies a requested memory size, wherein the memory management functions are configured to maintain a single list of data structures describing the physical computer memory, the list of data structures comprising a first data structure describing a first area of the physical computer memory that is available for allocation, the first area comprising a first memory portion and a second memory portion contiguous to the first memory portion, the first data structure comprising a first pointer node, a first size node, and a first next node, the first pointer node referencing a beginning of the first memory portion of the physical computer memory, the first size node describing a combined memory size of the first memory portion and the second memory portion, the first next node referencing a null value, and wherein each and every data structure in the list of data structures describes an unallocated portion of the physical computer memory;

in response to receiving the allocation request, determining whether the requested memory size is available for allocation;

in response to determining that the requested memory size is available for allocation through the first memory portion, (i) allocating the first memory portion, (ii) updating the first pointer node from referencing the beginning of the first memory portion to referencing a beginning of the second memory portion, (iii) updating the first size node from describing the combined memory size of the first memory portion and the second memory portion to describing a memory size of the second memory portion, and (iv) returning a pointer to first memory portion in response to the allocation request;

receive a request to deallocate a second area of the physical computer memory that has been allocated, the request comprising a pointer to the second area of the physical computer memory to be deallocated; and in response to receiving the deallocation request, determine the size of the second area, determining whether second area was allocated by the memory management functions, and in response to determining that the second area was allocated by the memory management functions, (i) deallocate the second area, (ii) create a second data structure describing the second area, and (iii) update the first next node from referencing the null value to referencing the second data structure, the second data structure comprising a second pointer node, a second size node, and a second next node, the second pointer node referencing a beginning of the second area, the second size node describing a memory size of the second area, and the second next node referencing the null value.

9. The computer storage medium of claim 8, wherein the computer-readable instructions are part of a Basic Input/Output System ("BIOS") of the computer.

10. An apparatus capable of managing the allocation of memory in a pre-boot environment of a computer, comprising:

a processor;

a memory area operatively connected to the processor;

a firmware operatively connected to the processor; and one or more Basic Input/Output System ("BIOS") routines contained in the firmware and configured to receive an allocation request from a program executing in the pre-boot environment for allocating a portion of a physical computer memory, wherein the allocation request identifies a requested memory size, wherein the memory management functions are configured to maintain a single list of data structures describing the physical computer memory, the list of data structures comprising a first data structure describing a first area of the physical computer memory that is available for allocation, the first area comprising a first memory portion and a second memory portion contiguous to the first memory portion, the first data structure comprising a first pointer node, a first size node, and a first next node, the first pointer node referencing a beginning of the first memory portion of the physical computer memory, the first size node describing a combined memory size of the first memory portion and the second memory portion, the first next node referencing a null value, and wherein each and every data structure in the list of data structures describes an unallocated portion of the physical computer memory;

in response to receiving the allocation request, determining whether the requested memory size is available for allocation;

in response to determining that the requested memory size is available for allocation through the first memory portion, (i) allocating the first memory portion, (ii) updating the first pointer node from referencing the beginning of the first memory portion to referencing a beginning of the second memory portion, (iii) updating the first size node from describing the combined memory size of the first memory portion and the second memory portion to describing a memory size of the second memory portion, and (iv) returning a pointer to first memory portion in response to the allocation request;

receive a request to deallocate a second area of the physical computer memory that has been allocated, the request comprising a pointer to the second area of the physical computer memory to be deallocated; and in response to receiving the deallocation request, determine the size of the second area, determining whether second area was allocated by the memory management functions, and in response to determining that the second area was allocated by the memory management functions, (i) deallocate the second area, (ii) create a second data structure describing the second area, and (iii) update the first next node from referencing the null value to referencing the second data structure, the second data structure comprising a second pointer node, a second size node, and a second next node, the second pointer node referencing a beginning of the second area, the second size node describing a memory size of the second area, and the second next node referencing the null value.

11. The apparatus of claim 10, wherein determining whether the portion of the memory area to be deallocated corresponds to a portion of the memory allocated by the BIOS routines comprises reading and verifying a unique digital signature comprising a unique string of characters from the portion of the memory area identified by the pointer received with the request.

* * * * *